United States Patent
Zhu et al.

(10) Patent No.: US 10,277,920 B2
(45) Date of Patent: Apr. 30, 2019

(54) METHOD, ELECTRONIC DEVICE, SYSTEM, COMPUTER PROGRAM PRODUCT AND CIRCUIT ASSEMBLY FOR REDUCING ERROR IN VIDEO CODING

(71) Applicant: Conversant Wireless Licensing S.a r.l., Luxembourg (LU)

(72) Inventors: Chunbo Zhu, Anhui (CN); Ye-Kui Wang, Tampere (FI); Houqiang Li, Anhui (CN)

(73) Assignee: Conversant Wireless Licensing S.a.r.l., Luxembourg (LU)

( * ) Notice: Subject to any disclaimer, the term of this patent is extended or adjusted under 35 U.S.C. 154(b) by 0 days.

(21) Appl. No.: 15/831,981

(22) Filed: Dec. 5, 2017

(65) Prior Publication Data
US 2018/0098095 A1    Apr. 5, 2018

Related U.S. Application Data

(63) Continuation of application No. 11/549,788, filed on Oct. 16, 2006, now Pat. No. 9,872,045.

(51) Int. Cl.
| | |
|---|---|
| *H04N 19/895* | (2014.01) |
| *H04N 19/147* | (2014.01) |
| *H04N 19/172* | (2014.01) |
| *H04N 19/61*  | (2014.01) |
| *H04N 19/103* | (2014.01) |
| *H04N 19/136* | (2014.01) |
| *H04N 19/166* | (2014.01) |

(52) U.S. Cl.
CPC ........ *H04N 19/895* (2014.11); *H04N 19/103* (2014.11); *H04N 19/136* (2014.11); *H04N 19/147* (2014.11); *H04N 19/166* (2014.11); *H04N 19/172* (2014.11); *H04N 19/61* (2014.11)

(58) Field of Classification Search
CPC ............................ H04N 19/147; H04N 19/895
USPC ......................................................... 375/240
See application file for complete search history.

(56) References Cited

U.S. PATENT DOCUMENTS

| 6,757,654 B1 | 6/2004 | Westerlund et al. |
| 7,006,576 B1 | 2/2006 | Hannuksela |
| (Continued) | | |

OTHER PUBLICATIONS

Overview of the H.264-AVC Video Coding Standard; Wiegand; et al.-2003 (Year: 2018).*

(Continued)

*Primary Examiner* — Luis Perez-Fuentes
(74) *Attorney, Agent, or Firm* — Conversant Wireless Licensing

(57) ABSTRACT

A method, electronic device, computer program product, system and circuit assembly are provided for allocating one or more redundant pictures by taking into consideration the information content of the primary pictures, with which the redundant pictures would be associated. In particular, primary pictures that are determined to be more sensitive to transmission loss or corruption may be allocated one or more redundant pictures, while those that are less sensitive may not be so allocated. By selectively allocating redundant pictures to only those primary pictures that are more sensitive, the method disclosed reduces the amount of overhead associated with redundant pictures and increases the coding efficiency, without sacrificing the integrity of the video data.

12 Claims, 12 Drawing Sheets

(56) References Cited

U.S. PATENT DOCUMENTS

| | | |
|---|---|---|
| 7,095,874 B2 | 8/2006 | Moskowitz et al. |
| 7,170,923 B2 | 1/2007 | Yeo et al. |
| 7,402,369 B2 | 7/2008 | Okubo et al. |
| 7,418,147 B2 | 8/2008 | Kamaci et al. |
| 7,584,495 B2 | 9/2009 | Hannuksela et al. |
| 7,586,924 B2 | 9/2009 | Wiegand |
| 7,688,893 B2 | 3/2010 | Morimoto et al. |
| 8,068,721 B2 | 11/2011 | Nguyen |
| 8,369,397 B2 | 2/2013 | Bordes et al. |
| 8,879,635 B2 * | 11/2014 | Raveendran .......... H04N 5/144 340/870.13 |
| 9,872,045 B2 * | 1/2018 | Zhu ....................... H04N 19/147 |
| 2003/0196078 A1 | 10/2003 | Wise et al. |
| 2003/0202580 A1 | 10/2003 | Noh et al. |
| 2004/0218669 A1 | 11/2004 | Hannuksela |
| 2005/0123056 A1 * | 6/2005 | Wang .................... H04N 19/70 375/240.25 |
| 2007/0014360 A1 | 1/2007 | Botzko et al. |
| 2007/0081586 A1 * | 4/2007 | Raveendran .......... H04N 5/144 375/240.1 |
| 2008/0019446 A1 | 1/2008 | Hannuksela |
| 2008/0088743 A1 * | 4/2008 | Zhu ....................... H04N 19/147 348/578 |
| 2009/0052543 A1 | 2/2009 | Wu et al. |

OTHER PUBLICATIONS

Google Patent Search log; 2018 (Year: 2018).*
Ieee NPL search log; 2018 (Year: 2018).*
SPIE_NPL_search_log; 2018 (Year: 2018).*
Zhu et al., "Coding of Redundant Pictures for Improved Error Resilience", Proposal, University of Science and Tehcnology of China (USTC), Nokia Corporation, Jan. 2006, pp. 1-7.
Overview of the H.264-AVC Video Coding Standard; Wiegand 2003.
LEEE NPL Search Log.
SPIE NPL Search Log.
Google Patent Search Log.

* cited by examiner

METHOD, ELECTRONIC DEVICE, SYSTEM, COMPUTER PROGRAM PRODUCT AND CIRCUIT ASSEMBLY FOR REDUCING ERROR IN VIDEO CODING

CROSS-REFERENCE TO RELATED APPLICATIONS

This a continuation of pending U.S. application Ser. No. 11/549,788, filed on Oct. 16, 2006, the disclosure of which is incorporated herein by reference in its entirety.

FIELD

In general, exemplary embodiments of the present invention relate to video coding and, in particular, to error resilient video coding using redundant pictures.

BACKGROUND

In many instances, video transmission systems are prone to transmission errors in the form of the corruption or loss of one or more transmitted pictures or frames. The effects of transmission errors are compounded due to the use of motion-compensated temporal prediction or predictive coding. Predictive coding is the process of predicting the contents of some, or a majority, of the image frames or pictures in a video sequence based on the other, previous frames or pictures in the sequence. Predictive coding is advantageous because it provides high compression efficiency. However, because pictures or frames are often used to predict subsequent pictures or frames, transmission errors not only affect the decoding quality of the current picture, but are also propagated to the following coded pictures. This is referred to as "temporal error propagation."

Several techniques have been developed for reducing or eliminating temporal error propagation. These techniques include both interactive and non-interactive methods. Interactive methods require that the recipient transmit information about the corrupted decoded areas and/or transport packets back to the transmitter (i.e., feedback). Where feedback is not possible, or preferable, non-interactive methods, such as forward error correction (FEC) or the use of redundant pictures, may be utilized.

The use of redundant pictures has been standardized by H.264/AVC or simply H.264 or AVC. H.264 was developed by the joint video team (JVT) of the ISO/IEC Motion Picture Experts Group (MPEG) and the ITU-T (International Telecommunication Union, Telecommunications Standardization Sector) Video Coding Experts Group (VCEG).

A redundant picture is a redundant coded representation of a picture, referred to as a primary picture, or a part of a picture (e.g., one or more macroblocks). The redundant picture may be considered the same temporal representation of the information content of the primary picture. Each primary coded picture may have as many as 127 redundant pictures associated therewith. If the region represented by the primary picture is lost or corrupted due to transmission errors, a correctly received redundant picture containing the same region may be used to reconstruct the region.

While the use of redundant pictures may be beneficial, it also increases the overhead associated with video encoding and transmission, as well as detrimentally affects the overall coding efficiency. It would, therefore, be beneficial to derive a method of allocating fewer or no redundant pictures to one or more primary pictures in order to cut down on the number of pictures that would need to be encoded and transmitted, but without reducing or eliminating the temporal error propagation-reducing benefits of using redundant pictures.

One such method has been proposed to the JVT by Miska M. Hannuksela and the named inventors of the present application (Zhu et al., *Coding of Redundant Pictures for Improved Error Resilience*, Joint Video Team (JVT) of ISO/IEC MPEG & ITU-T VCEG (ISO/IEC JTC1/SC29/WG11 and ITU-T SG16 Q.6) 18th Meeting: Bangkok, Thailand, 14-20 January, 2006, hereinafter "JVT-R058"). According to the method of JVT-R058, a hierarchical method is used for allocating redundant pictures to only certain primary pictures. In particular, for each group of pictures (GOP), a redundant picture may be coded for the first picture in the GOP using the first picture of the previous GOP as a reference. In the case of the very first GOP, either an intra coded redundant picture or no redundant picture may be allocated for the first picture. According to NT-R058, the GOP may further be divided into two or more sub-GOPs, and for the first picture of each latter sub-GOP (i.e., each sub-GOP following the first sub-GOP) a redundant picture may be coded using the first picture of the previous sub-GOP as a reference. As described above, the allocation method of JVT-R058 may be limited, however, because it is fixed, assuming that the number of pictures in a group of pictures (GOP), as well as the sub-GOP hierarchy, is fixed. In other words, the same primary picture(s) of a GOP are allocated one or more redundant pictures in all instances.

The method of JVT-R058, therefore, does not take into consideration the fact that certain pictures of the GOP, or of the overall video sequence, may be more sensitive to transmission error or corruption. In particular, there are often certain pictures where the loss or corruption of these pictures may cause more distortion to the overall video data than the loss or corruption of other pictures. Because of this, more protection should be afforded to these, more sensitive, pictures.

A need, therefore, exists for a mechanism for adaptively allocating redundant pictures, wherein pictures that are more sensitive to transmission loss or corruption are better protected.

BRIEF SUMMARY

In general, exemplary embodiments of the present invention provide an improvement over the known prior art by, among other things, providing a method of adaptively allocating redundant pictures according to the information content associated with the corresponding primary pictures. In particular, according to an embodiment of the present invention, the information content of a primary picture is analyzed in order to determine how sensitive that picture is to transmission error or loss. Based on that analysis, it may be determined whether and how many redundant pictures to associate with that primary picture. Generally speaking, if it is determined that the distortion that would likely be caused by loss or corruption of a particular primary picture is relatively high (e.g., exceeds a certain threshold), one or more redundant pictures would likely then be associated with that primary picture. For example, in order to determine the sensitivity of the primary picture, in one embodiment the mean absolute motion vector value of the primary picture may be calculated. This value or metric indicates how active the picture is, or, in other words, how great the difference is between the primary picture and the previous picture. If it is determined that the mean absolute motion vector value of the primary picture is high, indicating that the primary picture is very different from the previous picture and, therefore, that loss of that particular primary picture would likely cause a fair amount of distortion, one or more redundant pictures may be associated with that primary picture.

In accordance with one aspect, a method is provided of reducing error in encoding video data that includes one or more primary pictures. In one exemplary embodiment, the method includes: (1) evaluating the information content of at least one of the one or more primary pictures; and (2) determining, based at least in part on the information content of the primary picture, a number of redundant picture(s) to associate with the primary pictures. In this embodiment, the information content of the redundant picture corresponds to the information content of the primary picture.

In one exemplary embodiment, evaluating the information content of the primary picture involves calculating a metric that is associated with the information content of the primary picture and that provides an indication of a level of sensitivity of the primary picture to transmission loss or error. In order to then determine a number of redundant picture(s) to associate with the primary picture, it may be determined whether the metric exceeds a particular threshold, and a redundant picture may be associated with the primary picture where the metric does exceed the threshold. In one exemplary embodiment the metric is a mean absolute motion vector value associated with the primary picture. In another embodiment, the metric is a potential error propagation distortion associated with the primary picture.

In yet another exemplary embodiment, in order to evaluate the information content of at least one of the primary pictures, the one or more primary pictures of the video data are grouped into one or more groups of pictures and an estimate of the overall rate-distortion performance of at least one of the groups of pictures is determined. In particular, according to one exemplary embodiment, estimating the overall rate-distortion performance involves first determining a plurality of combinations of the groups of pictures, wherein each combination comprises a different association of primary pictures and redundant pictures, such that the resulting combination of primary pictures and redundant pictures differ for each combination, and then determining for each combination, a rate-distortion estimate. In this exemplary embodiment, determining a number of redundant picture(s) to associate with the primary picture may then involve selecting the combination with the lowest rate-distortion estimate.

In one exemplary embodiment, determining a number of redundant picture(s) to associate with the primary picture may involve determining whether to associate any redundant picture(s) with the primary picture at all.

According to another aspect, an electronic device is provided that is capable of reducing error in encoding video data that includes one or more primary pictures. In one exemplary embodiment the electronic device includes a processor and a memory in communication with the processor that stores an application executable by the processor, wherein the application is configured, upon execution, to: (1) evaluate the information content of at least one of the one or more primary pictures; and (2) determine, based at least in part on the information content of the primary picture, a number of redundant picture(s) to associate with the primary picture. In this exemplary embodiment, the information content of the redundant picture corresponds to the information content of the primary picture.

In accordance with yet another aspect, a computer program product is provided for reducing error in encoding video data that includes one or more primary pictures. The computer program product contains at least one computer-readable storage medium having computer-readable program code portions stored therein. The computer-readable program code portions of one exemplary embodiment include: (1) a first executable portion for evaluating the information content of at least one of the one or more primary pictures; and (2) a second executable portion for determining, based at least in part on the information content of the primary picture, a number of redundant picture(s) to associate with the primary picture, wherein the information content of the redundant picture corresponds to the information content of the primary picture.

In accordance with another aspect, a system is provided for reducing error in encoding video data that includes one or more primary pictures. In one exemplary embodiment, the system includes: (1) a means for evaluating the information content of at least one of the one or more primary pictures; and (2) a means for determining, based at least in part on the information content of the primary picture, a number of redundant picture(s) to associate with the primary picture, wherein the information content of the redundant picture corresponds to the information content of the primary picture.

According to yet another aspect, a circuit assembly is provided for reducing error in encoding video data that includes one or more primary pictures. In one exemplary embodiment, the circuit assembly includes: (1) a first logic element for evaluating the information content of at least one of the one or more primary pictures; and (2) a second logic element for determining, based at least in part on the information content of the primary picture, a number of redundant picture(s) to associate with the primary picture, wherein the information content of the redundant picture corresponds to the information content of the primary picture.

BRIEF DESCRIPTION OF THE SEVERAL VIEWS OF THE DRAWING(S)

Having thus described exemplary embodiments of the invention in general terms, reference will now be made to the accompanying drawings, which are not necessarily drawn to scale, and wherein:

Figure 4:
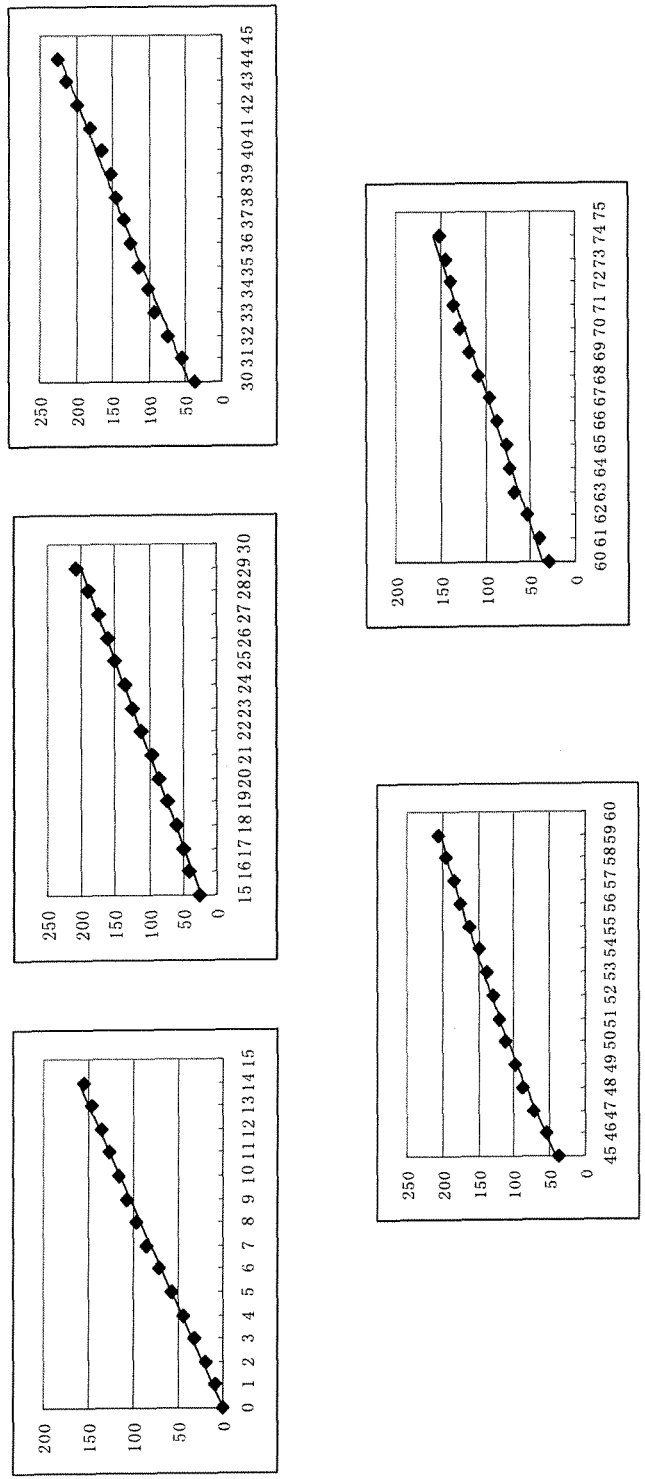
Figure 5:
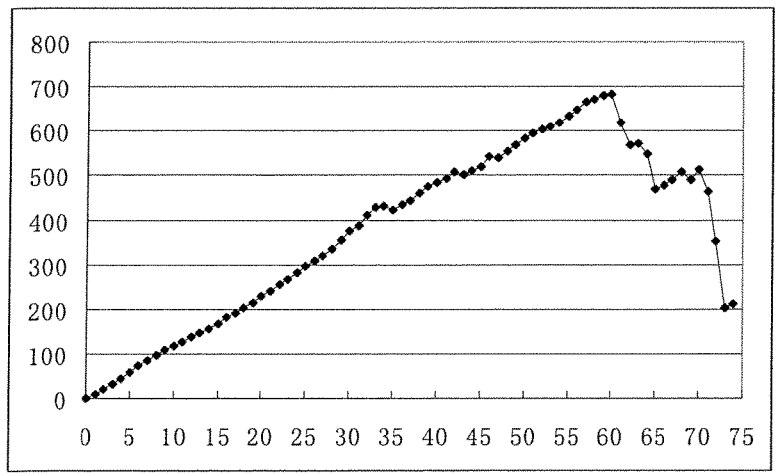
Figure 6:
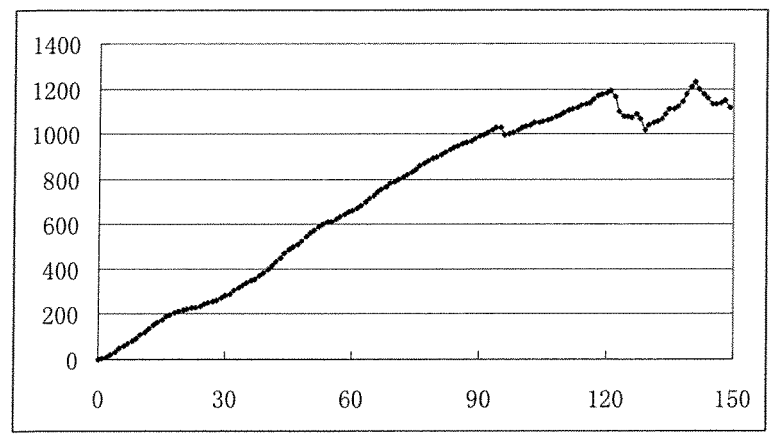

FIGS. 4-6 provide experimental results obtained when testing exemplary embodiments of the present invention;

FIGS. 7-10 illustrate the average peak signal-to-noise ratio ("PSNR") vs. packet loss rate curve under different bitrate constraints for one application testing performed in accordance with exemplary embodiments of the present invention;

FIGS. 11-16 illustrate the average decoded PSNR vs. bitrate curve under 10% and 20% packet loss rates, respectively, for a second application testing performed in accordance with exemplary embodiments of the present invention.

Figure 17:
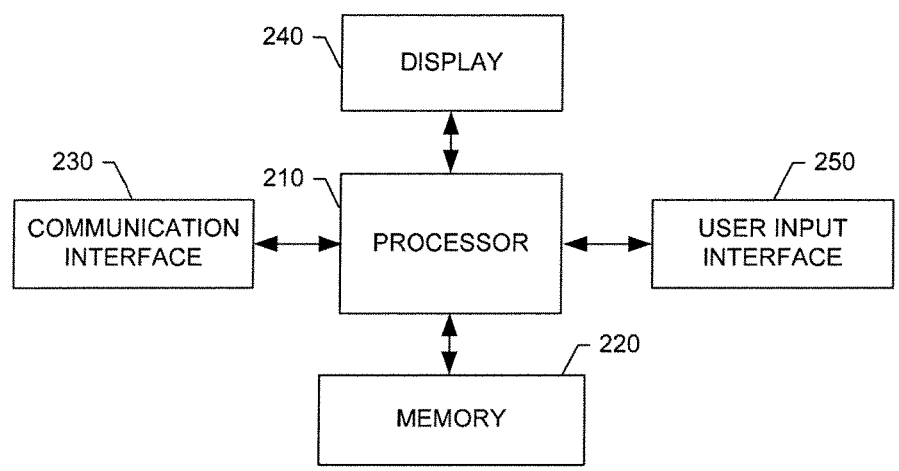
Figure 18:
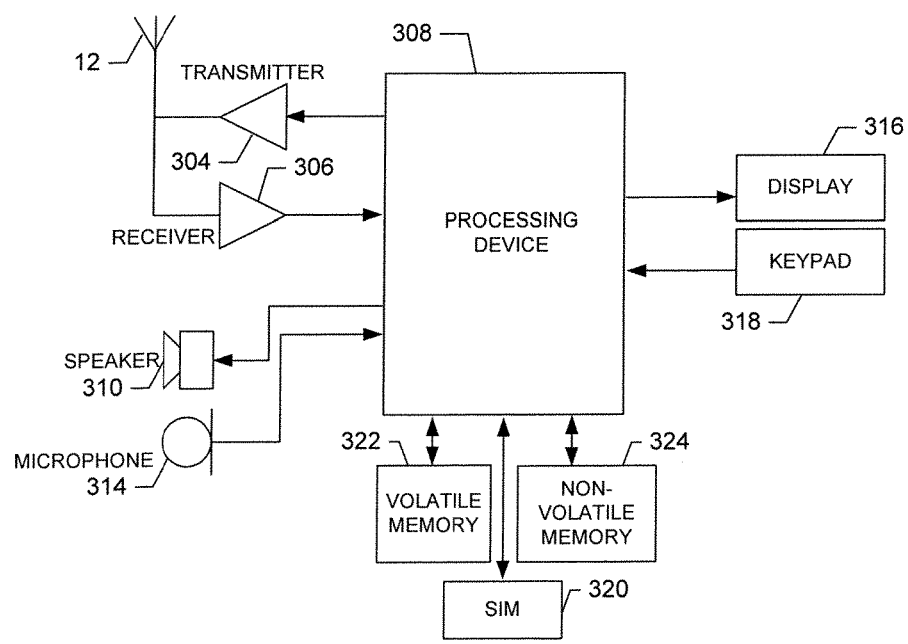

FIG. 17 is a schematic block diagram of an entity capable of reducing error in encoding video data in accordance with exemplary embodiments of the present invention; and FIG. 18 is a schematic block diagram of an electronic device capable of operating in accordance with an exemplary embodiment of the present invention.

DETAILED DESCRIPTION

Exemplary embodiments of the present invention now will be described more fully hereinafter with reference to the accompanying drawings, in which some, but not all embodiments of the inventions are shown. Indeed, exemplary embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview:

In general, exemplary embodiments of the present invention provide a method of allocating one or more redundant pictures that takes into consideration the information content of the primary pictures, with which the redundant pictures would be associated. In particular, according to exemplary embodiments, primary pictures that are determined to be more sensitive to transmission loss or corruption are allocated one or more redundant pictures, while those that are less sensitive may only be allocated a smaller number of redundant pictures or none at all. By selectively allocating redundant pictures by taking into consideration the sensitivity of the primary pictures, the method of exemplary embodiments of the present invention reduces the amount of overhead associated with redundant pictures and increases the coding efficiency, without sacrificing the integrity of the video data.

The "sensitivity" of the primary picture refers, generally, to the estimated breadth or extent of the consequences were the primary picture to be lost or corrupted. According to one exemplary embodiment, the extent of the consequences, or the likely distortion that would result from loss of a particular picture, may be calculated directly by calculating the potential error propagation distortion of each primary picture. Alternatively, the consequences or likely distortion may be estimated based on how similar the particular picture is to the previous picture transmitted (and received). This alternative embodiment is based on the fact that one method of responding to the loss or corruption of a primary picture is to replace the lost or corrupted picture with the previous picture received. If the lost or corrupted picture was very similar to the previous picture, then the resulting distortion in the overall video data would be minimal. In contrast, if the difference between the primary and previous picture is great, the resulting distortion may be much greater.

In yet another exemplary embodiment, an overall estimated distortion may be calculated for a group of pictures (GOP) including one or more primary pictures. In this embodiment, an estimated rate distortion may be calculated for each of a plurality of different combinations of primary pictures of the GOP having redundant pictures and primary pictures not having redundant pictures (e.g., all primary pictures in the GOP allocated a redundant picture, no primary pictures in the GOP allocated a redundant picture, only the first primary picture in the GOP allocated a redundant picture, etc.). The desired combination may then be selected based on the estimated rate distortion, such as by selecting the combination having the lowest estimated rate-distortion.

Methods of Allocating Redundant Pictures

Figure 1:
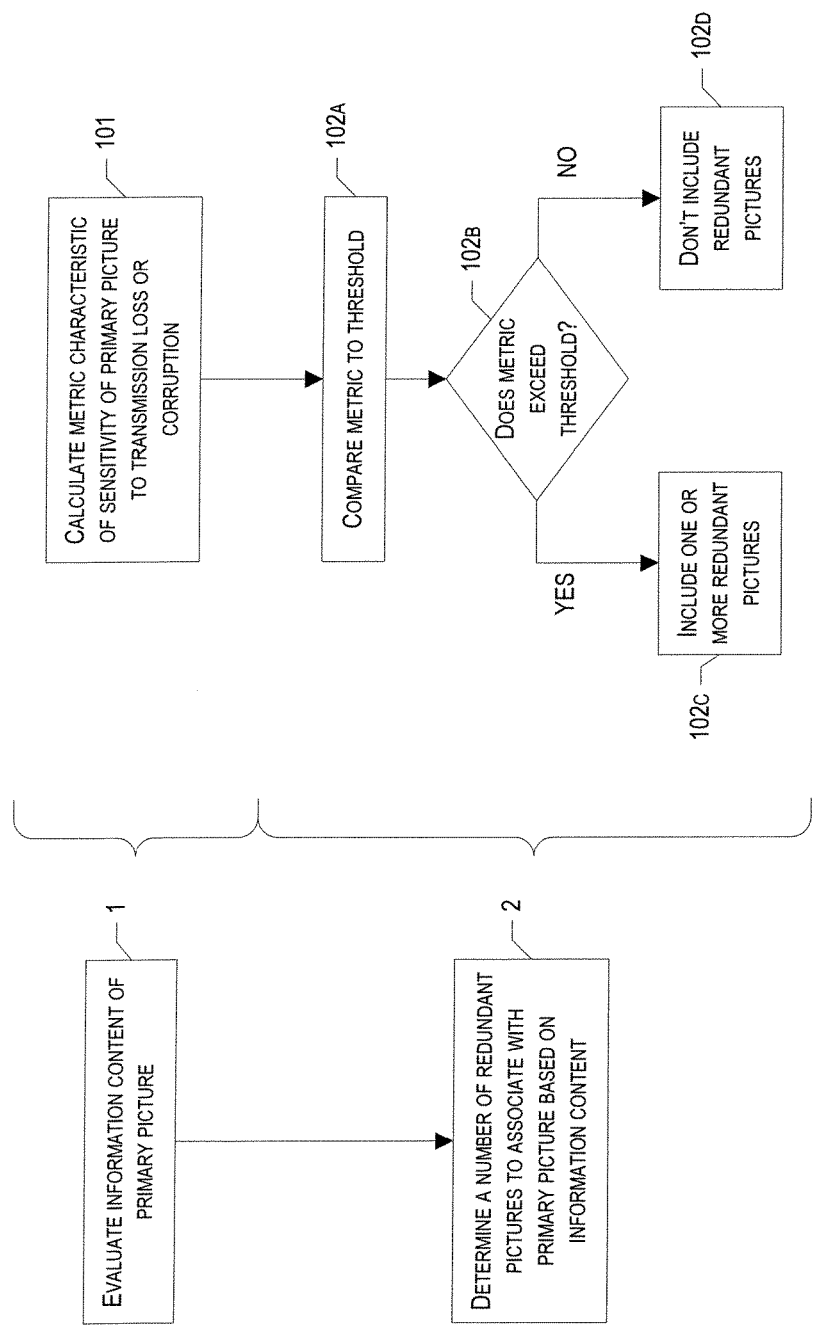
FIG. 1 is a flow chart illustrating the steps which may be taken in order to determine for which primary pictures to include one or more redundant pictures, in accordance with exemplary embodiments of the present invention.
Figure 2:
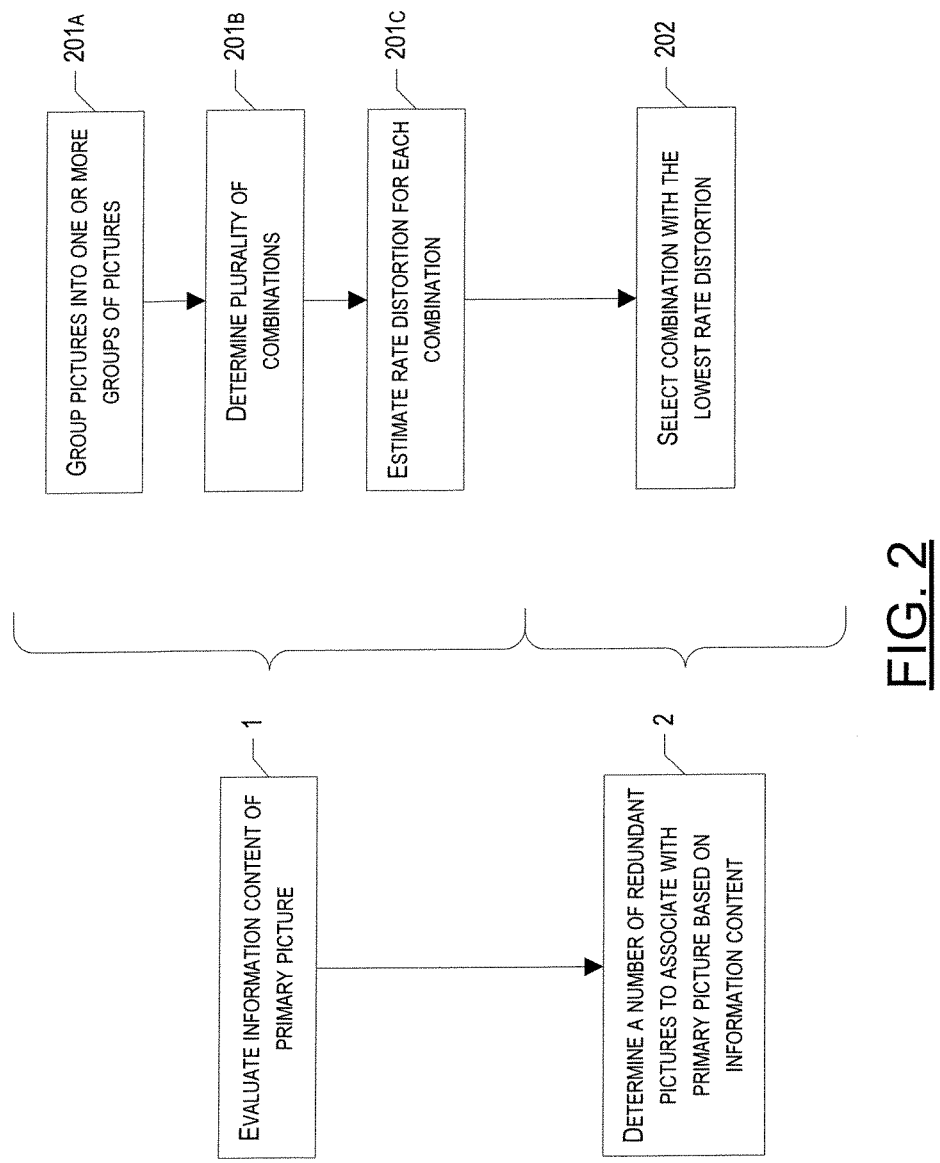
FIG. 2 is a flow chart illustrating the steps which may be taken in order to determine for which primary pictures to include one or more redundant pictures, in accordance with another embodiment of the present invention.

FIGS. 1 and 2 are flow charts that illustrate a method of allocating redundant pictures in accordance with exemplary embodiments of the present invention. As shown, the general method of embodiments of the present invention includes two steps. The first step, Step 1, is to evaluate the information content of the primary picture. In particular, the information content may be analyzed in order to determine a level of sensitivity to transmission loss or corruption associated with the primary picture. Once the information content has been evaluated, a determination can be made, in Step 2, as to how many redundant pictures to associate with the primary picture, based at least in part on the information content. Stated very generally, in one exemplary embodiment, the more sensitive the picture is to transmission loss or corruption, the more likely one or more redundant pictures will be allocated to that picture. In one exemplary embodiment, Step 2 may involve determining whether to associate any redundant pictures with the primary picture at all (i.e., the number of redundant pictures to be associated with the primary picture may be zero).

Also shown in FIGS. 1 and 2, respectively, are two more specific methods for allocating redundant pictures based on the more general steps described above. As one of ordinary skill in the art will recognize, however, these more specific methods are provided for exemplary purposes only and should not be taken as limiting the scope of exemplary embodiments of the invention in any way. Other similar methods of evaluating the information content of a picture in order to determine whether and how many redundant pictures to include may similarly be used without departing from the spirit and scope of exemplary embodiments of the present invention.

Adaptive Redundant Picture Allocation Based on Sensitivity Metric

Referring to FIG. 1, according to exemplary embodiments, the general step of evaluating the information content of the primary picture (Step 1) may include calculating a metric associated with the information content of the primary picture that provides an indication of the level of sensitivity of the primary picture to transmission loss or corruption (Step 101). Once the metric has been calculated, the general step of determining how many redundant pictures to associate with the primary picture (Step 2) may involve comparing the calculated metric to a predefined threshold value (Step 102A) in order to determine whether the metric exceeds the threshold value (Step 102B). If the metric exceeds the threshold value, indicating that the primary picture is sensitive to transmission loss or corruption, one or more redundant pictures may then be associated with the primary picture (Step 102C). Alternatively, if it is determined that the calculated metric does not exceed this predefined threshold, no or a fewer number of redundant pictures may be associated with the primary picture (Step 102D).

While not shown, in one exemplary embodiment, if it is determined, in Step 102B, that the metric exceeds the predefined threshold and, therefore, that one or more redundant pictures should be associated with the primary picture, one or more further steps may then be performed in order to determine exactly how many redundant pictures should be included. For example, the calculated metric may subsequently be compared to another, larger threshold value, wherein if the metric is larger than the second, larger threshold value, this provides an indication that the primary picture is particularly sensitive to transmission loss or corruption and, therefore, may require a larger number of redundant pictures. This step may be repeated any number of times, increasing the value of the predefined threshold each time, where it is desirable to associate multiple redundant pictures with the primary picture. Alternatively, a set number of redundant pictures (e.g., one) may be automatically associated with the primary picture if the calculated metric exceeds the first predefined threshold.

In one exemplary embodiment, the metric that is calculated may comprise the mean absolute motion vector value (hereinafter the "motion vector value") of the primary picture. In general, the motion vector value indicates how "active" the particular picture is. In other words, the motion vector value provides an indication of how much or to what extent the primary picture differs from the previous picture. A large motion vector value indicates that the primary picture is active and, therefore, is very different from the previous picture. Because lost or corrupted pictures, that do not have a redundant picture, are replaced by the previous picture, in most instances, the distortion caused by loss or corruption of a primary picture having a large motion vector value is large, since replacing it with the previous picture is less effective. As a result, the motion vector value provides a good indication of the level of sensitivity of the primary picture to transmission loss or corruption. In one exemplary embodiment, calculating the mean absolute motion vector value involves averaging the absolute motion vector value for all of the 4×4 blocks of the coded primary picture, e.g., according to the following equation:

$$\overline{MV} = \sum_{i=0}^{N-1} |MVX_i| + |MVY_i| \quad (1)$$

where $\overline{MV}$ denotes the mean absolute motion vector, N is the total number of 4×4 blocks of the coded primary picture, and $MVX_i$ and $MVY_i$, respectively, are the horizontal and vertical components of the motion vector of the i-th block.

In another exemplary embodiment, the metric that is calculated may comprise the potential error propagation distortion. While this embodiment may require performing a slightly more complicated calculation than the previous embodiment, as shown below, the potential error propagation distortion provides a more direct, and possibly more accurate, indication of the level of sensitivity of the primary picture.

One method of computing the potential error propagation distortion was proposed by Yuan Zhang, Wen Gao, Huifang Sun, Qingming Huang and Yan Lu in "Error Resilient Video Coding in H.264 Encoder With Potential Distortion Tracking," 2004 International Conference on Image Processing, Volume 1, pp. 163-166, 24-27 October 2004 (hereinafter "Zhang, et al.").

As specified in Zhang, et al., the overall distortion of a block of data in the primary picture $D_d$ can be represented by:

$$D_d = (1-p)(D_s + D_r) + pD_c \quad (2)$$

where p denotes an estimated packet loss rate, $D_s$ denotes the source coding distortion that is independent of transmission errors, $D_r$ denotes the distortion introduced by an erroneous reference picture, and $D_c$ denotes the concealment distortion. $D_c$ in equation (2) denotes error concealment distortion. For example, if the decoder concealment method is frame copy, then $D_c$ is:

$$D_c = \Sigma (f_{curr\_rec} - f_{prev\_rec})^2 \quad (3)$$

where $f_{curr\_rec}$ is the reconstructed pixel of the current block, and $f_{prev\_rec}$ is the reconstructed pixel at a corresponding position in the previous frame. $D_r$ in equation (2) was defined in Zhang, et al. as the following:

$$D_r = \sum_{m=1}^{4} w^m D_p^m \quad (4)$$

where $D_p^m$ is the error propagated distortion of the m-th reference block of the current block, and $w^m$ denotes a weighting factor applied to each reference block according to the overlapped area pointed to by the motion vector $(MV_x, MV_y)$ of the current block. The $D_p^m$ in equation (4) denotes the error propagated distortion $D_p$ of the m-th reference block. The $D_p$ of the current block is calculated by:

$$D_p = (1-p)D_r + p(D_c + D_p') \quad (5)$$

where $D_p'$ is the $D_p$ of the block in a previous frame used for concealing the current block. $D_p$ in equation (5) can be considered as a potential error propagated distortion and indicates the error propagation feature of a block. Frames with larger average $D_p$ are more sensitive to transmission errors. These frames should, therefore, be specially protected against errors. Thus according to one exemplary embodiment, $D_p$, can be used as a measurement to allocate redundant pictures.

To calculate $D_p$ and to allocate redundant pictures, the encoder of one exemplary embodiment may follow the following steps. First the potential error propagation distortion $D_p$ of the first frame of a sequence may be set to zero (i.e., $D_p = 0$). Next, $D_p$ can be calculated for each block. In particular, if the primary picture is the first picture in a group of pictures (GOPs), also referred to as the key picture, and if the key picture is intra coded, then $D_r$ is zero ($D_r$ of intra blocks in any frame must be zero) and the potential error propagation distortion is calculated based on the following equation:

$$D_p = p(D_c + D_p') \quad (6)$$

After encoding a whole frame, the $D_p$ of all blocks can then be averaged and the average compared with a threshold $D_T$. If $D_p > D_T$, it may be determined to encode one or more redundant picture(s) for the primary picture. Otherwise, no redundant pictures may be encoded for the primary picture. If at least one redundant picture is encoded, $D_p$ for the subsequent frame:

$$D_p = (1-p)D_{p\_primary} + p(1-p)D_{p\text{-}redundant} + p^2(D_c + D_p') \quad (7)$$

where $D_{p\_primary}$ is the $D_p$ of the primary picture and $D_{p\text{-}redundant}$ is the $D_p$ of the redundant picture.

Preferably, the coded redundant picture uses the previous key picture (i.e., the first picture of the previous GOP when the primary picture is a key picture, or the first picture of the current GOP when the primary picture is not a key picture) in decoding order, for inter prediction reference. Alternatively, the coded redundant picture may use the previous primary picture with a redundant picture for inter prediction reference.

Adaptive Redundant Picture Allocation Based on Optimized Overall Rate Distortion Referring to FIG. 2, another exemplary method is illustrated for evaluating the information content of the primary picture and determining, based at least in part on the information content, a number of redundant picture(s) to associate with the primary picture. In general, according to this exemplary embodiment, in order to evaluate the information content of the primary picture, the one or more primary pictures of the video data are first divided into one or more groups of pictures (GOPs) (Step 201A). Next, in Step 201B, a plurality of different combinations of at least one of the GOPs are formed, wherein each combination includes a different association of primary pictures and redundant pictures. For example in one combination of pictures of the GOP, each of the primary pictures has one or more redundant pictures associated therewith. Alternatively, in another combination none of the primary pictures have a redundant picture associated therewith. In other combinations any number and combination of primary pictures may have one or more redundant pictures associated therewith with each combination being different as noted above. For example, in a GOP having first and second images designated $I_1$ and $I_2$. One combination would be to have a primary picture of both $I_1$ and $I_2$, but no redundant pictures of either $I_1$ or $I_2$. A second combination would be to have a primary picture of both $I_1$ and $I_2$, a single redundant picture of $I_1$ and no redundant pictures of $I_2$. A third combination would be to have a primary picture of both $I_1$ and $I_2$, a single redundant picture of $I_2$ and no redundant pictures of $I_1$. A fourth combination would be to have a primary picture of both $I_1$ and $I_2$, two redundant pictures of $I_1$ and no redundant picture of $I_2$. A fifth combination would be to have a primary picture of both $I_1$ and $I_2$, two redundant pictures of $I_1$ and a single redundant picture of $I_2$. Additional combinations could also be created with each having a different number of redundant pictures for $I_1$ and $I_2$.

Once the various combinations have been determined, an estimate of the overall rate-distortion performance may then be calculated for each combination (Step 201C). Finally, in order to determine a number of redundant picture(s) to associate with at least one primary picture (Step 2), a combination is selected based upon the overall estimated rate-distortion performance. For example, the combination having the lowest overall estimated rate-distortion performance may be selected, in Step 202, thereby providing an optimized overall rate-distortion for the GOP.

The following describes this embodiment in more detail and, in particular, how the overall estimated rate-distortion performance for each combination may be calculated according to one exemplary embodiment of the present invention.

Rate-Distortion Models for Different Coding Modes

Assuming that there are two coding modes for each primary picture of a GOP. The first mode (hereinafter "mode 1") represents "not to code a redundant picture," while the second mode (hereinafter "mode 2") represents "to code a redundant picture." The total rate-distortion cost (hereinafter "RD-cost") of all the latter frames within one GOP (i.e., all of the frames in a GOP following the current primary picture) for the two modes can be represented by:

$$\text{RDcost(mode1)} = D_1 + \lambda R_1$$

$$\text{RDcost(mode2)} = D_2 + \lambda R_2 \qquad (8)$$

where $D_1$ and $D_2$ denote the total end-to-end distortion of all the frames after the current primary picture in the same GOP for modes one and two, respectively. $R_1$ and $R_2$ are the total bits of latter frames for modes one and two, respectively, and $\lambda$ represents the Lagrange multiplier as described.

Therefore, the mode decision problem can be represented by:

$$\text{mode*} = \text{argmin}[\text{RDcost(mode)}] \qquad (9)$$

where mode* denotes the best coding mode. This means that if the following holds, $$\text{RDcost(mode1)} > \text{RDcost(mode2)} \qquad (10)$$

then a redundant picture will be coded for the primary picture; otherwise, no redundant picture will be coded.

From equations (8), (9) and (10), mode 2 will be selected only if:

$$D_1 - D_2 > \lambda(R_2 - R_1) \qquad (11)$$

In other words, a redundant picture will be coded where equation (11) is true. Note that, $$R_2 - R_1 = R_{rp} \qquad (12)$$

where $R_{rp}$ denotes the number of coded bits of a corresponding redundant picture. Finally, the mode selection condition is:

$$D_1 - D_2 > \lambda R_{rp} \qquad (13)$$

Distortion Computation and RDO-ARP Allocation

Figure 3:
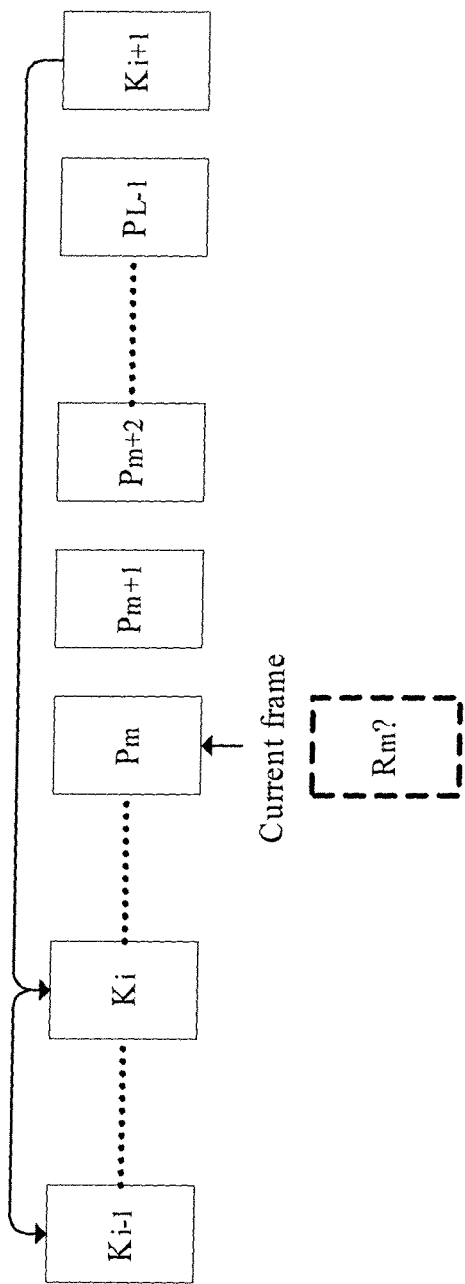
FIG. 3 illustrates the structure of a group of pictures (GOP) according to one exemplary embodiment of the present invention.

Referring to FIG. 3, the structure of a GOP is illustrated. As shown, the key frame $K_i$ of current GOP uses the key frame $K_{i-1}$ of the last GOP as a reference. As one of ordinary skill in the art will recognize, it is also possible for the key frame to use other frames as a reference. Assuming that a primary picture $P_m$ in GOP i is now being coded, and that the frame number of the current primary frame is m, the GOP length is L, the frame number of each inter-frame in the GOP is in a range from 1 to L−1; then, the mode decision problem that arises is whether to code a redundant picture for $P_m$ or not.

The total end-to-end distortion $D_{total}$ from primary frame $P_m$ to $P_{L-1}$ within one GOP can be calculated by:

$$D_{total} = \sum_{i=m}^{L-1} D_d(i) = \sum_{i=m}^{L-1} \{(1-p)[D_s(i) + D_r(i)] + pD_c(i)\} \qquad (14)$$

where $D_d(i)$ denotes the end-to-end distortion of i-th frame in the GOP, and $D_s(i)$, $D_r(i)$ and $D_c(i)$ are all of the i-th frame. Assuming that the error concealment algorithm used at the decoder is frame copy, from equation (5) above, then:

$$D_p(i) = (1-p)D_r(i) + p[D_c(i) + D_p(i-1)] \qquad (15)$$

and $D_{total}$ is:

$$D_{total} = \sum_{i=m}^{L-1} [(1-p)D_s(i) + D_p(i) - pD_p(i-1)] \qquad (16)$$

However, for any i>m, because $D_p(i)$ cannot be obtained due to the encoding order, it must be estimated.

In the following it is demonstrated that $D_p(i)$ approximately linearly increases as the prediction chain grows within one GOP, when a few blocks of each frame are intra coded. FIGS. 4 through 6 illustrate the experimental results obtained from the test sequence named Foreman. The x-coordinates of FIGS. 4 through 6 denote the frame number in a GOP, and the y-coordinates denote the averaged $D_p$ (in Mean Squared Error ("MSE")) of each frame. The estimated packet loss rate was 10%. The GOP length was set to 15 frames for FIG. 4 (which illustrates the results of five different GOPs), 75 frames for FIG. 5, and 150 frames for FIG. 6. As can be seen, for a small size of GOP, the error propagation is approximately linearly increased.

So assuming the length of GOP is limited and few blocks are intra coded, then:

$$D_p(i+1) = D_p(i) + D_{delta} \quad (17)$$

where $D_{delta}$ is a constant for all possible values of i. The constant only depends on the estimated packet loss rate and the characteristics of the input video sequence. Therefore:

$$D_{total} = \quad (18)$$

$$\sum_{i=m}^{L-1}(1-p)D_s(i) + [(L-m)-p(L-m-1)]D_p(m) - pD_p(m-1) +$$

$$\frac{1}{2}[(L-m)(L-m-1) - p(L-m-1)(L-m-2)]D_{delta}$$

As a result, $D_1$ and $D_2$ are expressed as follows, in the same form as $D_{total}$:

$$D_1 = \quad (19)$$

$$\sum_{i=m}^{L-1}(1-p)D_s(i) + [(L-m)-p(L-m-1)]D_{p1}(m) - pD_{p1}(m-1) +$$

$$\frac{1}{2}[(L-m)(L-m-1) - p(L-m-1)(L-m-2)]D_{delta}$$

and $$D_2 = \quad (20)$$

$$\sum_{i=m}^{L-1}(1-p)D_s(i) + [(L-m)-p(L-m-1)]D_{p2}(m) - pD_{p2}(m-1) +$$

$$\frac{1}{2}[(L-m)(L-m-1) - p(L-m-1)(L-m-2)]D_{delta}$$

where $D_{p1}(m)$ and $D_{p2}(m)$ denote the error propagated distortion of the m-th frame in a GOP for mode 1 and mode 2, respectively. For mode 1, $D_{p1}(m)$ is just the error propagated distortion of the current primary picture, while $D_{p2}(m)$ must be the sum of error propagated distortion of the current primary picture and a corresponding redundant picture according to equation (7). So, $$D_{p1}(m) = D_{p\_primary}(m)$$

$$D_{p2}(m) = (1-p)D_{p\_primary}(m) + p(1-p)D_{p\_redundant}(m) + p^2(D_c + D_p) \quad (21)$$

On the other hand, for an earlier frame $P_{m-1}$, $$D_{p2}(m-1) = D_{p1}(m-1) \quad (22)$$

Then, from equations (19), (20), (21) and (22), one gets:

$$D_1 - D_2 = [(L-m) - p(L-m-1)][pD_{p\_primary} - p(1-p)D_{p\_redundant} - p^2(D_c + D_p)] \quad (23)$$

Finally, the mode decision of equation (11) depends on the value of the following inequation:

$$p[(L-m) - p(L-m-1)][D_{p\_primary}(m) - (1-p)D_{p\_redundant}(m) - p(D_c + D_p)] > \lambda R_{rp} \quad (24)$$

That means that if equation (24) is true, a redundant picture may be coded for the corresponding primary picture; else, no redundant picture should be coded.

Lagrange Multiplier Selection

As in equation (8) above, the cost of each mode can be calculated by:

$$Cost = D + \lambda R \quad (25)$$

where Cost denotes the rate-distortion cost, D denotes the estimated distortion, R denotes the estimated coding rate, and $\lambda$ is the Lagrange multiplier. Further combining equations (18) and (25), and letting the derivative of Cost to R be zero, then:

$$\lambda = -\frac{dD}{dR} = -\sum_{i=m}^{L-1}(1-p)\frac{dD_s}{dR} = (1-p)(L-m)\lambda_o \quad (26)$$

where $\lambda_o$ is the Lagrange multiplier in an error free environment. The Lagrange multiplier in an error free environment for H.264/AVC is defined as:

$$\lambda_o = 0.85 \cdot 2^{\frac{q}{3}} \quad (27)$$

where q denotes the quantization parameter.

This derivation yields some insight into the selection of the Lagrange parameter in the error-prone transmission environment for coding redundant pictures. The packet loss rate p must be estimated at the encoder side. How the packet loss rate p is estimated is out of the scope of exemplary embodiments of this invention. As p increases, $\lambda$ decreases and therefore, the cost of coding a redundant picture decreases. As a result, more redundant pictures should be coded.

Simulations Performed to Show Performance of Exemplary Embodiment

In order to illustrate the performance of the foregoing exemplary embodiments of the invention, a few simulations have been performed. The following provides a quick description of the simulation conditions. The tested methods were implemented in the H.264 reference software, named Joint Model (JM), version 10.2. In addition, test conditions common to those described in S. Wenger, "*Common Conditions for Wire-Line, Low Delay IP/UDP/RTP Packet Loss Resilient Testing*," ITU-T VCEG N79r1, September 2001, were applied. A fixed packet size of 1400 bytes was used. All pictures of a sequence were encoded once, and the resulting packet stream was concatenated in order to fulfill a 4000 pictures requirement. The numerically lowest constant quantization parameter was used for the entire sequence that stays within the bit rate constraints.

The tests were performed using two coding modes of sequences: A) coding with periodic intra-coded key pictures and B) coding with a first intra-coded picture and the rest being inter-coded pictures. The two coding modes were targeted for two different application scenarios. One application scenario (referred to hereinafter as "Application A") was for applications such as broadcast and video conferences, for which frequent random access points must be provided for newcomers to join in. Periodic intra-frames were coded for this case. The second application scenario (referred to hereinafter as "Application B") represented the applications for which intra-coded pictures with a large number of bits cannot be inserted frequently, to allow for smooth bit rate that affects required buffer size and end-to-end delay. In this set of simulations, all pictures except the very first picture were inter-coded under these constraints.

The error concealment for all testing cases was Frame copy. Constrained intra prediction was used for all the cases including exemplary embodiments of the present invention and the baseline. Each picture of a sequence used one reference picture. Loss-Aware Rate Distortion Optimization (LA-RDO), which is a flexible and robust rate-optimization technique for H.264/AVC coding to select coding mode and reference frame for each macroblock where the channel statistics are included in the optimization process, was used as the baseline. Exemplary embodiments of the invention including Adaptive allocation of Redundant Pictures (ARP) using the mean absolute motion vector value, and Rate-Distortion Optimized Adaptive allocation of Redundant Pictures (RDO-ARP) were compared with the baseline. Repeated Redundant Pictures (RRP), which means a redundant picture is just a copy or repetition of the corresponding primary picture, and Hierarchically allocated Redundant Pictures (HRP), which was specified in JVT-R058, were also tested and compared.

LA-RDO was optimized for target packet loss rate of 5% and number of decoders of 30. For HRP, ARP and RDO-ARP, the key picture (also the start picture) of each GOP was intra-coded or inter-coded referencing the key picture of the last GOP, and the redundant picture of the key picture always used the key picture of the last GOP as a reference. For ARP and RDO-ARP, all redundant pictures, except the redundant picture of the key picture, used the key picture of the same GOP as a reference. Other primary pictures used the latest coded picture as a reference. For HRP, ARP, RDO-ARP and RRP, the GOP length for testing sequence News QCIF (Quarter Common Intermediate Format—a videoconferencing format that specifies a video sequence with each frame containing 144 lines and 176 pixels per line) was 10; for Foreman QCIF the GOP length was 15; and for Paris CIF (Common Intermediate Format—a videoconferencing format that specifies a video sequence with each frame containing 288 lines and 352 pixels per line) the GOP length was 15.

The coarsely quantized RDO-ARP (RDO-ARP CQ), differed from RDO-ARP only in that redundant pictures were coarsely quantized in comparison to primary pictures. The quantization parameter (QP) value for redundant picture, denoted as OPr was equal to QPp+6, where QPp was the QP value of primary pictures. RDO-ARP with non-fixed GOP length (RDOARP_no_GOP) was also tested. For this case, a redundant picture was coded according to equation (24) with L equal to the number of primary pictures in a whole sequence. Any redundant picture in this case uses the previous primary picture, for which a redundant picture was coded as a reference. All testing cases were performed under 3%, 5%, 10% and 20% packet loss rates.

Figure 7:
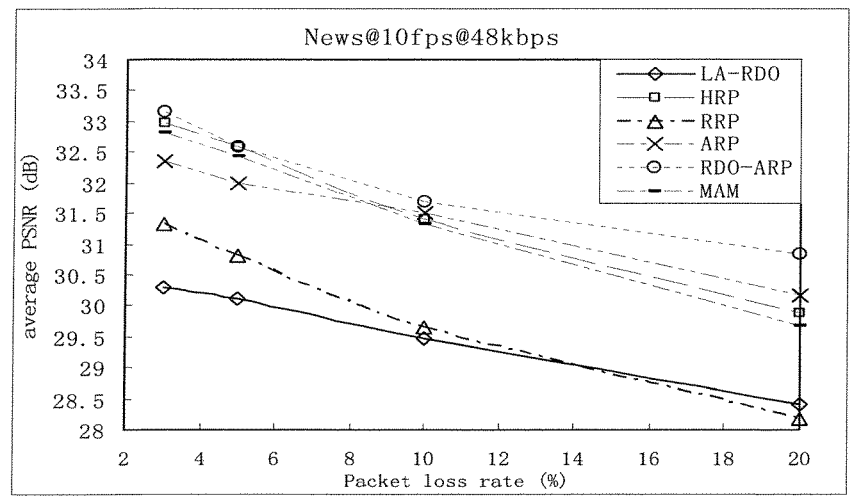
Figure 8:
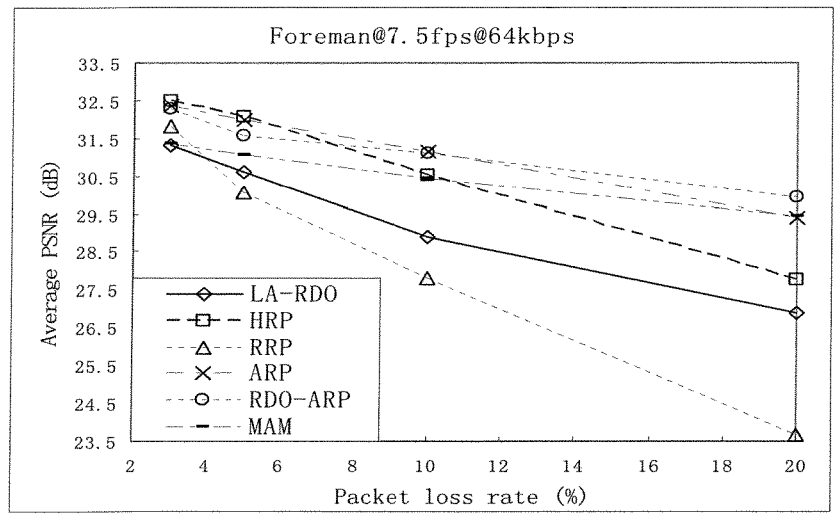
Figure 9:
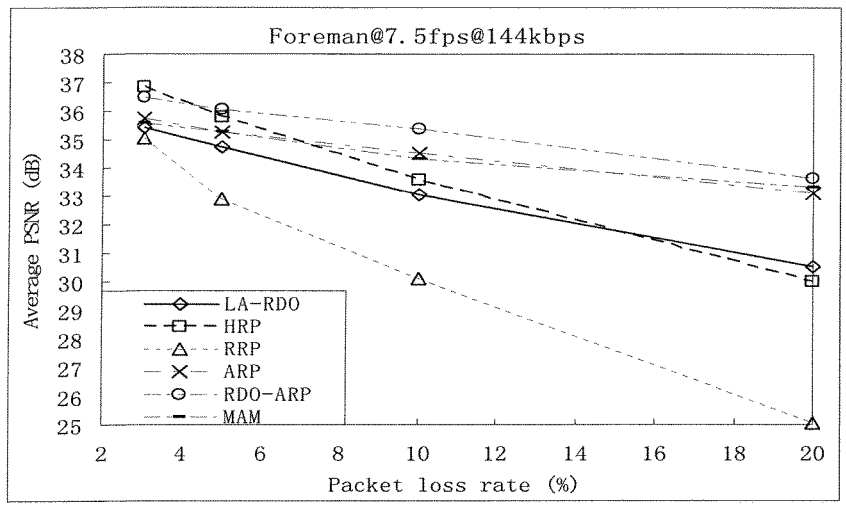

The results of the foregoing simulations are shown in FIGS. 7 through 16. FIGS. 7 through 9 illustrate the average decoded peak signal-to-noise ratio ("PSNR") vs. packet loss rate curve under different bitrate constraints for application A. FIGS. 11 through 16 illustrate the average decoded PSNR vs. bitrate curve under 10% and 20% packet loss rates respectively for application B. In particular, FIG. 7 illustrates the average PSNR (dB) vs. packet loss rate (%) for testing sequence News QCIF at 10 fps and 48 kbps for application A. The mean absolute value of motion vectors threshold chosen for MAM-encoding was 2.0. The threshold chosen for ARP-encoding was 14.0 at 10% estimated packet loss rate.

Figure 10:
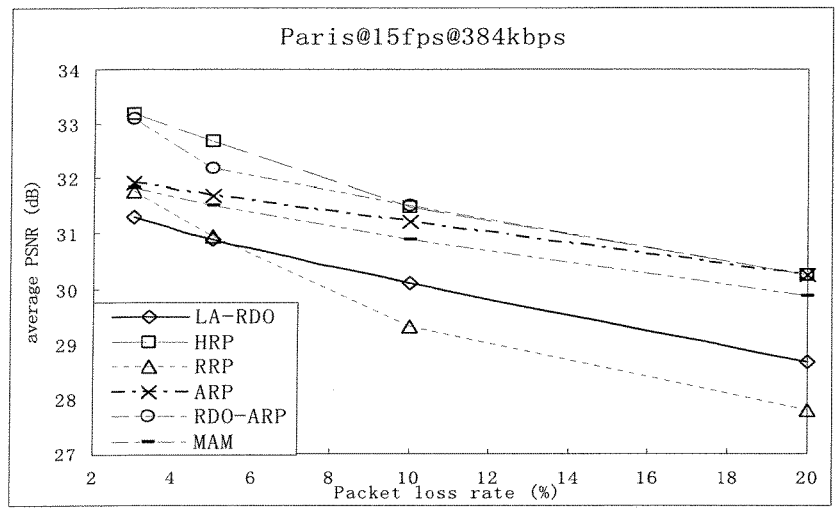

FIG. 8 illustrates the average PSNR (dB) vs. packet loss rate (%) for testing sequence Foreman QCIF at 7.5 fps and 64 kbps for application A. The mean absolute value of motion vectors threshold chosen for MAM-encoding was 5.0. The threshold chosen for ARPencoding was 32.0 at 10% estimated packet loss rate. FIG. 9 illustrates the average PSNR (dB) vs. packet loss rate (%) for testing sequence Foreman QCIF at 7.5 fps and 144 kbps for application A. The mean absolute value of motion vectors threshold chosen for MAM-encoding was 5.0. The threshold chosen for ARP-encoding was 22.0 at 10% estimated packet loss rate. Finally, FIG. 10 illustrates the average PSNR (dB) vs. packet loss rate (%) for testing sequence Paris CIF at 15 fps and 384 kbps for application A. The mean absolute value of motion vectors threshold chosen for MAM-encoding was 1.2. The threshold chosen for ARP-encoding was 9.0 at 10% estimated packet loss rate.

Figure 11:
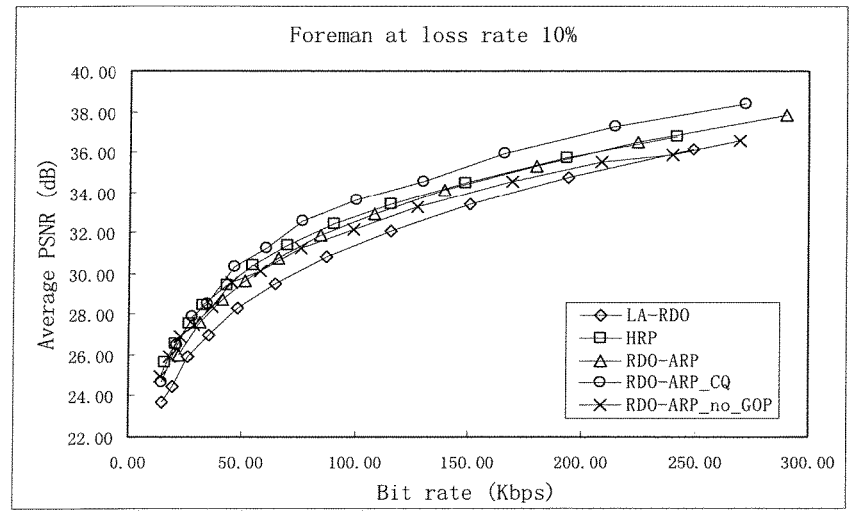
Figure 12:
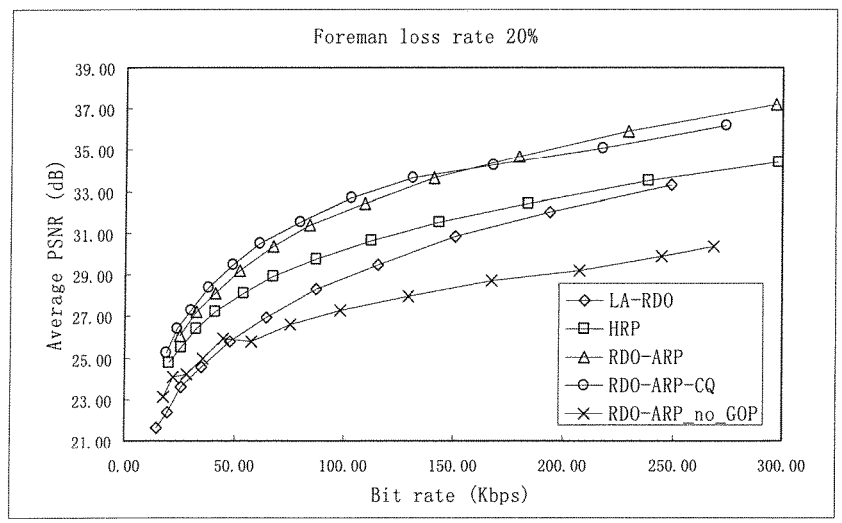
Figure 13:
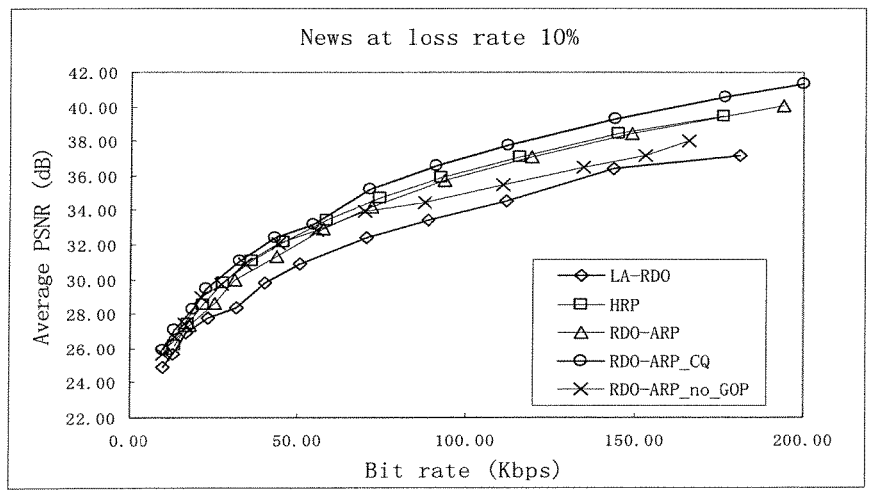
Figure 14:
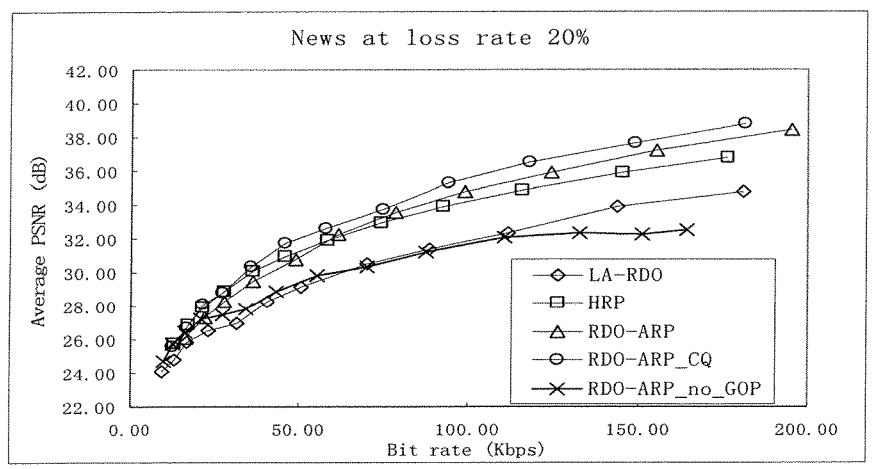
Figure 15:
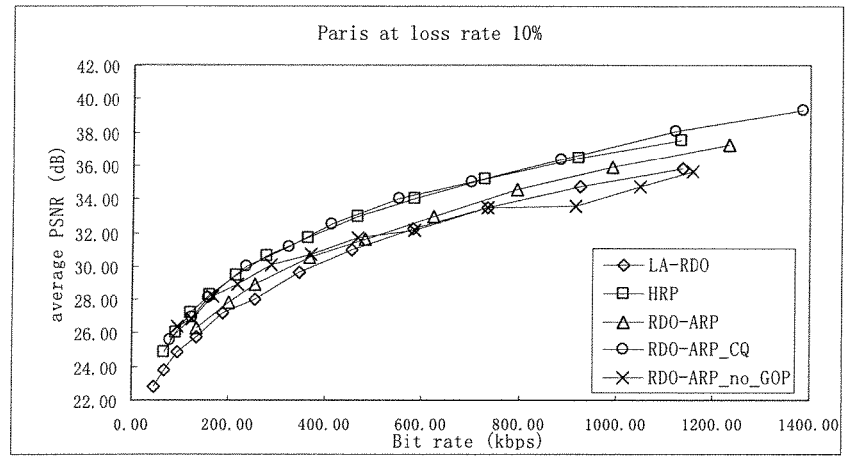
Figure 16:
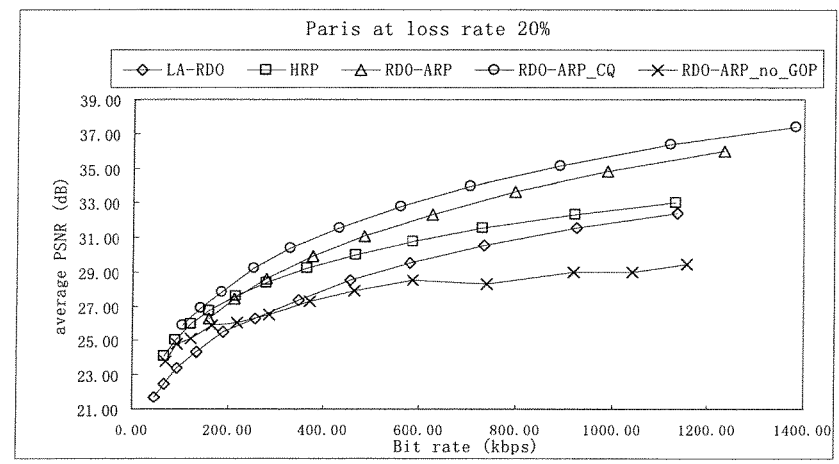

Turning now to Application B, FIGS. 11 and 12 illustrate the Average PSNR (dB) vs. bit rate (Kbps) for testing sequence Foreman QCIF at packet loss rates of 10% and 20%, respectively, for application B. FIGS. 13 and 14 illustrate the average PSNR (dB) vs. bit rate (Kbps) for testing sequence News QCIF at packet loss rates of 10% and 20%, respectively, for application B. Finally, FIGS. 15 and 16 illustrate the average PSNR (dB) vs. bit rate (Kbps) for testing sequence Paris CIF at packet loss rates of 10% and 20%, respectively, for application B.

As can be seen from the simulation results, the proposed redundant picture coding and allocation algorithms of exemplary embodiments of the present invention outperform other methods in error-prone environments.

Overall System and Mobile Device:

Referring now to FIG. 17, a block diagram of an entity capable of reducing error in encoding video data using one of the exemplary methods described above is shown in accordance with one embodiment of the present invention. The entity capable of evaluating the information content of a primary picture, for example in one of the manners described above, and of determining a number of redundant picture(s) to associate with the primary picture, based at least in part on the information content of the primary picture, includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. As shown, the entity capable of selecting for which primary pictures one or more redundant picture(s) should be encoded can generally include means, such as a processor 210 or other logic elements connected to a memory 220, for performing or controlling the various functions of the entity. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data from a user, such as a keypad, a touch display, a joystick or other input device.

Reference is now made to FIG. 18, which illustrates one type of electronic device that would benefit from embodiments of the present invention. As shown, the electronic device may be a mobile station 10, and, in particular, a cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

The mobile station includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 18, in addition to an antenna 302, the mobile station 10 includes a transmitter 304, a receiver 306, and means, such as a processing device 308, e.g., a processor, controller or other logic elements, that provides signals to and receives signals from the transmitter 304 and receiver 306, respectively. These signals include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 308, such as a processor, controller, computing device or other logic elements, includes the circuitry required for implementing the video, audio, and logic functions of the mobile station and is capable of executing application programs for implementing the functionality discussed herein. For example, the processing device may be comprised of various means including a digital signal processor device, a microprocessor device, and various analog to digital converters, digital to analog converters, and other logic elements. The control and signal processing functions of the mobile device are allocated between these devices according to their respective capabilities. The processing device 308 thus also includes the functionality to convolutionally encode and interleave message and data prior to modulation and transmission. Further, the processing device 308 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 310, a microphone 314, a display 316, all of which are coupled to the controller 308. The user input interface, which allows the mobile device to receive data, can comprise any of a number of devices allowing the mobile device to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 320, a removable user identity module (R-UIM) (not shown), or the like, which typically stores information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, in one embodiment of the present invention, the memory may store computer program code for evaluating the information content of a primary picture (e.g., by calculating the mean absolute motion vector value or the potential error propagation distortion of the particular primary picture, or by calculating the overall rate-distortion performance of various combinations of a group of pictures), and for determining a number of redundant pictures to associate with the primary picture based at least in part on the information content of the primary picture.

While the method, electronic device, computer program product, system and circuit assembly of exemplary embodiments of the present invention were described above in conjunction with mobile communications applications, it should be understood, that the method, electronic device, computer program product, system and circuit assembly of embodiments of the present invention can be utilized in conjunction with a variety of other applications, both in the mobile communications industries and outside of the mobile communications industries. For example, the method, electronic device, computer program product, system and circuit assembly of exemplary embodiments of the present invention can be utilized in conjunction with wireline and/or wireless network (e.g., Internet) applications.

CONCLUSION

As described above and as will be appreciated by one skilled in the art, embodiments of the present invention may be configured as a method, electronic device, system and circuit assembly. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these exemplary embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
evaluating the information content of a primary picture in a video data sequence by calculating a metric characterizing a sensitivity level to transmission loss of the primary picture;
comparing the metric to one or more threshold values; and
based on the result of the comparing of the metric to the one or more threshold values, selecting a first number of redundant pictures or a second number of redundant pictures to associate with the primary picture;
wherein the information content of each redundant picture corresponds to the information content of at least a portion of the primary picture;
and wherein the metric characterizing a sensitivity level comprises one of a mean absolute motion vector value associated with the primary picture and a potential error propagation distortion associated with the primary picture.

2. The method of claim 1, wherein the comparing step comprises:
comparing the metric with a plurality of threshold values;
and wherein the selecting step comprises:
selecting the first number of redundant pictures to associate with the primary picture responsive to the metric not exceeding a first one of the plurality of threshold values; and
selecting the second number of redundant pictures responsive to the largest threshold value exceeded by the metric.

3. The method of claim 1, wherein the first number of redundant pictures is zero.

4. The method of claim 1, further comprising:
repeating the evaluating, comparing, and selecting steps for a plurality of primary pictures in the video data sequence.

5. An electronic device comprising:
a processor; and
a memory in communication with the processor, the memory storing an application executable by the processor, wherein the application is configured, upon execution, to:
evaluate the information content of a primary picture in a video data sequence by calculating a metric characterizing a sensitivity level to transmission loss of the primary picture;
compare the metric to one or more threshold values; and
based on the result of the comparison, select a first number of redundant pictures or a second number of redundant pictures to associate with the primary picture, wherein the information content of each redundant picture corresponds to the information content of at least a portion of the primary picture;
and wherein the metric characterizing a sensitivity level comprises one of a mean absolute motion vector value associated with the primary picture and a potential error propagation distortion associated with the primary picture.

6. The device of claim 5, wherein the application is configured to compare the metric to the one or more threshold values by:
comparing the metric with a plurality of threshold values;
and wherein the application is configured to select a first or second number of redundant pictures by:
selecting the first number of redundant pictures to associate with the primary picture responsive to the metric not exceeding a first one of the plurality of threshold values; and selecting the second number of redundant pictures responsive to the largest threshold value exceeded by the metric.

7. The device of claim 5, wherein the first number of redundant pictures is zero.

8. The device of claim 5, wherein the application is configured to repeat the evaluating, comparing, and selecting for a plurality of primary pictures in the video data sequence.

9. A non-transitory computer-readable storage medium containing program instructions, the program instructions operable, when executed on one or more processors to:
   evaluate the information content of a primary picture in a video data sequence by calculating a metric characterizing a sensitivity level to transmission loss of the primary picture;
   compare the metric to one or more threshold values; and
   based on the result of the comparison, selecting between a first number of redundant pictures and a second number of redundant pictures to associate with the primary picture, wherein the information content of each redundant picture corresponds to the information content of at least a portion of the primary picture;
   and wherein the metric characterizing a sensitivity level comprises one of a mean absolute motion vector value associated with the primary picture and a potential error propagation distortion associated with the primary picture.

10. The non-transitory computer-readable storage medium of claim 9, wherein the program instructions are operable to compare the metric to the one or more threshold values by:
   comparing the metric with a plurality of threshold values;
   and wherein the program instructions are operable to select a first or second number of redundant pictures by:
   selecting the first number of redundant pictures to associate with the primary picture responsive to the metric not exceeding a first one of the plurality of threshold values; and
   selecting the second number of redundant pictures responsive to the largest threshold value exceeded by the metric.

11. The non-transitory computer-readable storage medium of claim 9, wherein the first number of redundant pictures is zero.

12. The non-transitory computer-readable storage medium of claim 9, wherein the program instructions are operable to repeat the evaluating, comparing, and selecting for a plurality of primary pictures in the video data sequence.

* * * * *